(12) United States Patent
van Ingen

(10) Patent No.: US 7,942,312 B2
(45) Date of Patent: May 17, 2011

(54) SYSTEM AND METHOD FOR OBTAINING OBJECT DATA

(75) Inventor: Jeroen van Ingen, Bergen (NL)

(73) Assignee: IdeAtics B.V., Amsterdam (NL)

( * ) Notice: Subject to any disclaimer, the term of this patent is extended or adjusted under 35 U.S.C. 154(b) by 372 days.

(21) Appl. No.: 12/089,915

(22) PCT Filed: Oct. 11, 2006

(86) PCT No.: PCT/NL2006/000512
§ 371 (c)(1), (2), (4) Date: Jun. 1, 2008

(87) PCT Pub. No.: WO2007/043867
PCT Pub. Date: Apr. 19, 2007

(65) Prior Publication Data
US 2008/0256123 A1    Oct. 16, 2008

(30) Foreign Application Priority Data
Oct. 11, 2005  (NL) ..................... 1030164

(51) Int. Cl.
*G06F 17/30* (2006.01)
(52) U.S. Cl. .................. 235/375; 235/472.01
(58) Field of Classification Search .......... 235/375, 235/472.01; 340/572.1, 572.7, 10.51, 5.92
See application file for complete search history.

(56) References Cited

U.S. PATENT DOCUMENTS

| | | | |
|---|---|---|---|
| 2007/0266782 A1* | 11/2007 | Bartz et al. | 73/156 |
| 2008/0117028 A1* | 5/2008 | Karstens | 340/10.51 |
| 2008/0189161 A1* | 8/2008 | Daily et al. | 705/8 |
| 2008/0218354 A1* | 9/2008 | Lorentz et al. | 340/572.7 |
| 2008/0309497 A1* | 12/2008 | Bryant | 340/572.8 |

FOREIGN PATENT DOCUMENTS
WO    2005/043470    5/2005

* cited by examiner

*Primary Examiner* — Allyson N Trail
(74) *Attorney, Agent, or Firm* — Young & Thompson

(57) ABSTRACT

In a method and a system for obtaining object data representative of an object, the object is provided with at least one identification carrier on which identification data are stored, the method including:—reading identification data from the identification carrier with a read unit;—determining from the identification data location data of a network location of a server element connected to an electronic network and on which object data representing the relevant object are stored;—sending the identification data on the basis of the location data via a communication connection over the electronic network between the read unit and the server element associated with the determined network location;—the server element determining task data from the identification data;—having the server means execute the associated task on the basis of the task data so as to generate and/or process object data representing the identified object.

46 Claims, 3 Drawing Sheets

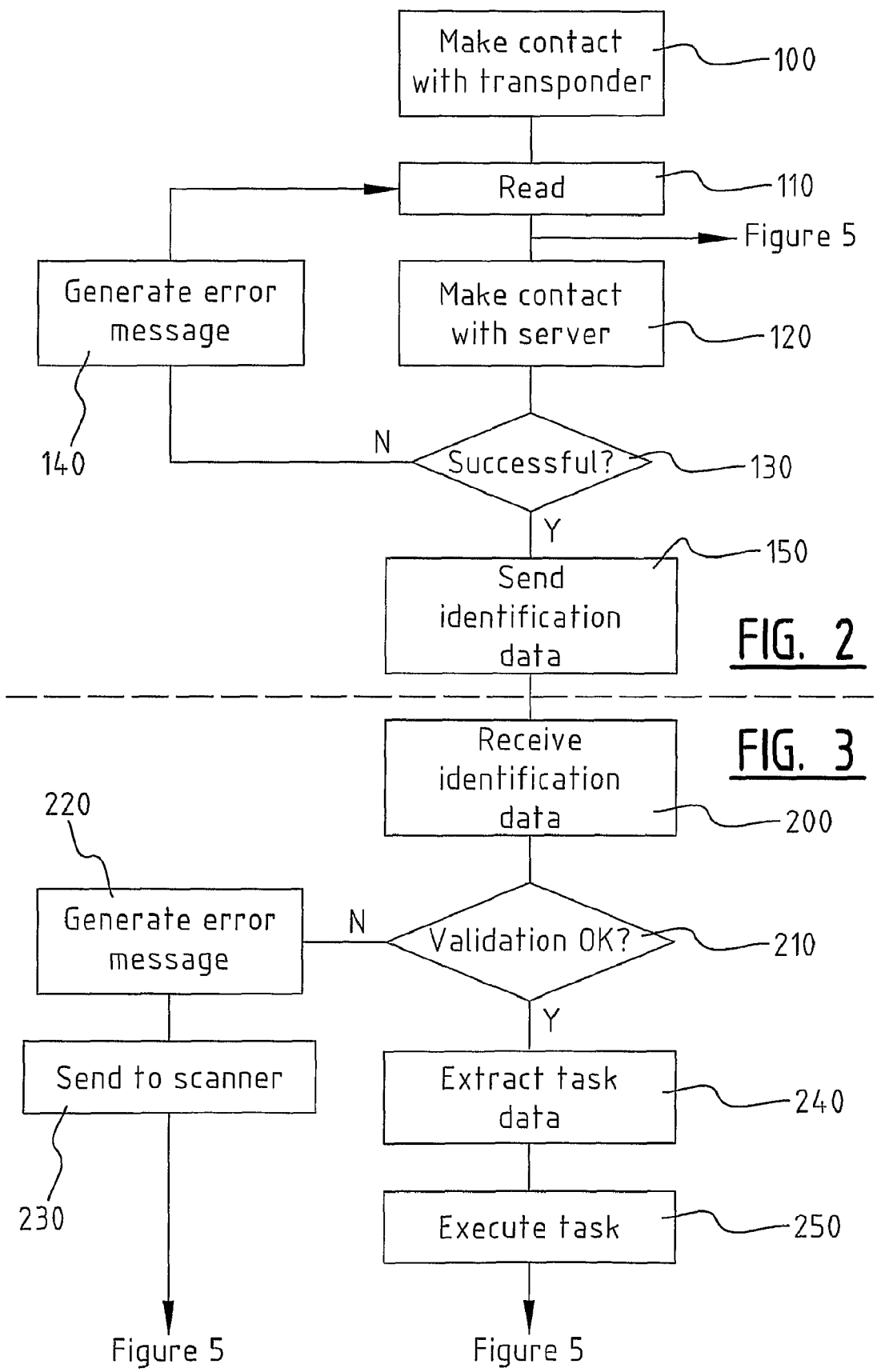

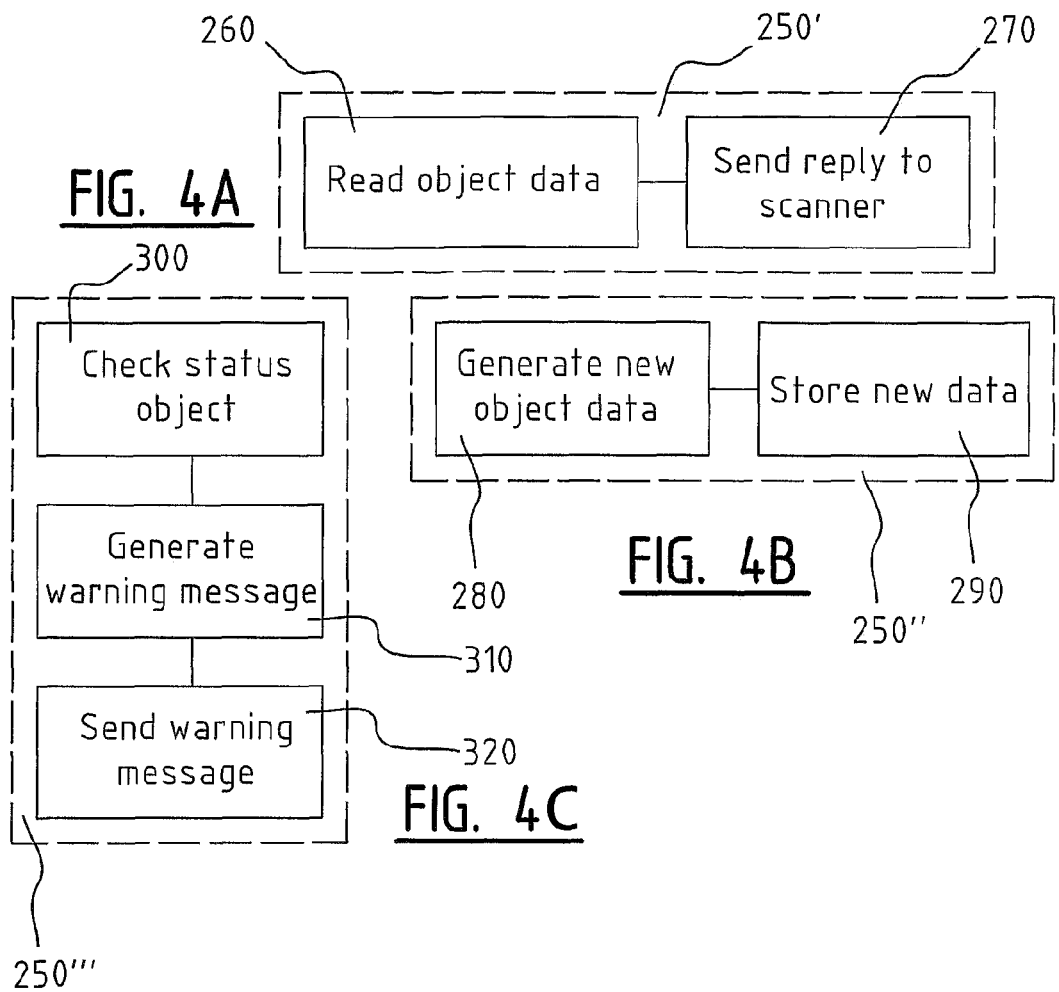
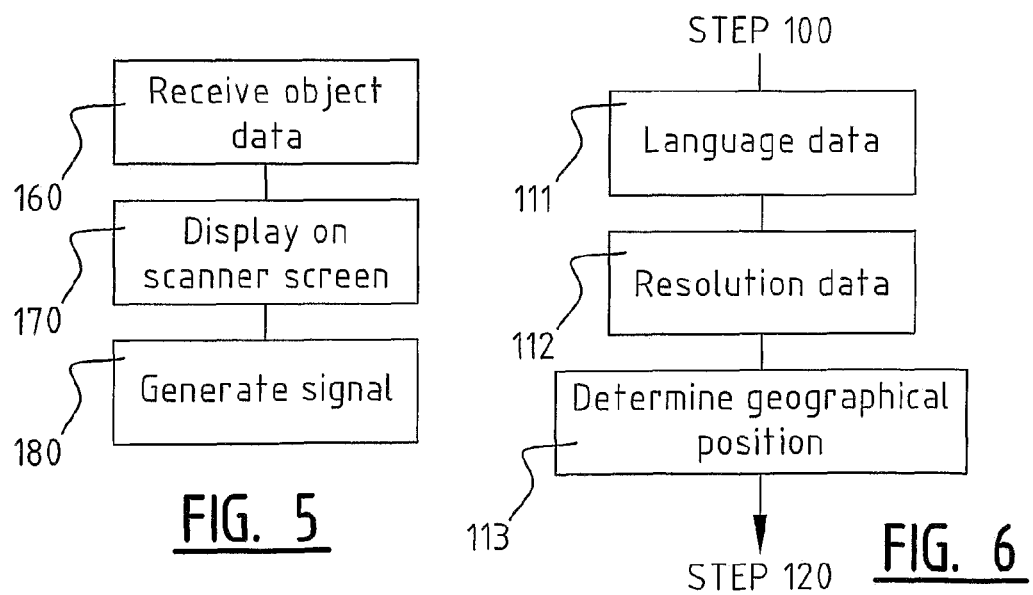

SYSTEM AND METHOD FOR OBTAINING OBJECT DATA

The present invention relates to a method and a system for obtaining object data representative of an object for the purpose of identifying the object, wherein the object is provided with at least one identification carrier on which identification data are pre-stored, and wherein object data of a number of objects are pre-stored on server means.

Systems are known wherein identification of an object, such as a (semi-)product, a (reusable) packaging, money, an animal, a person and the like, takes place by providing the object in question with an identification carrier which can be read for identification purposes. The identification carrier can in principle be coupled fixedly here to the object or be incorporated therein, although this is not essential. It is for instance possible to virtually "link" an object, such as a person who does not wish or is unable to have a chip in the object material, to an identification carrier by subjecting the object to an identity check on the basis of proof of identity such as a passport.

An identification carrier is provided with identification data with which the identity of the object can be determined. When the object is provided with a Radio Frequency Identification (RFID) transponder, also referred to as chip or tag, electronic data representative of the identity of the object can be stored in the transponder. Many types of RFID transponders are known, including passive transponders which obtain their energy from the electromagnetic fields of the reading devices, and active transponders which have an internal energy source.

As stated above, such a Radio Frequency Identification (RFID) transponder can be read in wireless manner using a reading device, also referred to as a scanner, and displayed on the screen of the scanner or associated auxiliary equipment. Further information can sometimes be read in addition to the above-mentioned data relating to the identity of the transponder. The quantity of data to be stored on such transponders is however quite small in view of the limited storage capacity of the transponders. Further information concerning the relevant object, such as the name and the address of the owner and/or manufacturer of the object, administrative data relating to the object such as date of manufacture, date of sale, date of delivery to different distributors, and multimedia information (such as images, video, sound, animations relating to the object) is however not possible, or only possible in insufficient measure, because of the limited data storage capacity of such transponders. Specific information, such as information in the form of the above-mentioned administrative data, is also difficult to manage on such a transponder in view of the difficulties encountered in protecting the information and in respect of authorization of persons or devices wishing to gain access to the information. This means in practice that, apart from the identification data, practically no object data are stored in the information carriers.

Data on the transponder of an object must also be modified or changed during the life cycle of this object, this being problematic in the known transponders since programming of the transponder with modified object data requires a programming unit.

Some of the known systems operate in a closed domain, such as an own or "private" domain, which means that the information carriers and reading devices used are compatible to each other, for instance in respect of read protocol, storage protocol, the meaning of the different data, the communication network for mutual communication and the like. In the public domain, wherein a determined public scanner receives different types of identification carrier to scan, which possibly have different read/storage protocols and whose data format can differ, the reading device does not know whether, and if so, where object data are stored on the data carriers, how the object data can be accessed, what meaning can be given to the possibly read object data and whether the data read from a carrier are interchangeable with the data read from another carrier. The same applies for applications in which information is exchanged between two or more closed domains. In such a situation the reading devices and the identification carriers are not compatible with each other, or at least insufficiently so. In order to nevertheless be able to read the different identification carriers, very complex and therefore expensive reading devices are required. This has prevented large-scale application of such a system in the public domain. Furthermore, due to the object data being stored on the information carrier itself, potentially sensitive data can easily be retrieved by unauthorized persons, this being in many cases undesirable.

In order to obviate this problem it is possible to envisage collecting object data of all different types of identification carrier in a single central database, wherein the location of the object data is constant. This however limits to a great extent the utility and flexibility of the system. Furthermore, the parties which make use of the object data, such as in the case of a commercial product the various commercial parties in the distribution network, are generally not prepared to make sensitive object data accessible on a single, permanently accessible database. There is then the chance in some cases that the different parties can read each other's data.

Communication systems are known in which a Radio Frequency Identification (RFID) transponder tag can be read using a scanner, wherein the scanner is connected to a web server, or origin server, via a communication network such as the internet. Information is stored on the RFID transponder tag in the form of a Uniform Resource Locator (URL). The scanner can exchange contact data with the web server via the communication network on the basis of the URL. However, when the web server requires additional information on a user of the scanner, contact data must be sent back and forth between the user and the website, and this forms a heavy load for the communication network.

Known from US 2004/0193676 is a communication system in which the URL for finding the location of the website is extended with a variable string. On the basis of the URL with variable string the scanner can request information locally from the user of the scanner. The variable string is herein adapted to control the scanner such that it requests the additional information from the user. Once the user has entered the requested information in the scanner, the URL with variable string is reformatted into a dynamic URL incorporating the locally obtained information. Because the information is requested locally from the user, the exchange of data via the communication network can be reduced.

In addition to the locally obtained information, said variable string can comprise a location, among others, of an origin server which manages the domain designated in the dynamic URL. The locally obtained information is then sent via the communication network to the origin server for further processing thereof.

Not known however from US 2004/0193676 is identification of objects on the basis of object data pre-stored on the server and identification data pre-stored on the transponder, and obtaining on the basis thereof object data representative of the object.

It is an object of the present invention to provide an improved method and an improved system for obtaining object data in which the above stated drawbacks are obviated.

It is also an object of the present invention to provide a system and method in which management of the object data and management of the information data, and thereby of the information carrier, can be separated.

According to a first aspect of the present invention, there is provided for this purpose a method of the above specified type, comprising of:

reading identification data from the identification carrier of an object with a read unit;

determining from the identification data location data of one or more network locations of server means connected to an electronic network;

sending the identification data to the server means via the network on the basis of the location data;

the server means determining from the identification data one or more identification codes with which the relevant object can be identified;

comparing the identification codes with said object data pre-stored on the server means;

identifying the relevant object with the identification codes;

the server means determining task data from the identification data;

having the server means execute the associated task on the basis of the task data so as to generate new object data representative of the identified object and/or to modify existing object data.

When the identification carrier comprises location data of one or more network-accessible servers, the reading device can automatically make contact with the correct server means without the reading device having to be instructed for this purpose beforehand. The correct server can after all be accessed depending on the location data stored on the information carrier. By moreover storing task data in the information carrier, sending these same data to the server means and executing a specific task on the basis of the task data received by the server means in order to generate and/or process object data, the read unit and/or the server means themselves do not have to be adjusted (programmed) for this purpose. In order to link the relevant object to the object data pre-stored on the server means use is made of identification codes pre-stored on the identification carrier, of (identification codes from the) object data pre-stored on the server means and the links, pre-stored on the server means, between the different identification carriers (and associated object(s)) and the associated object data. An identification method is hereby provided which can be applied in flexible and general manner in the public domain and between closed domains.

The processing of the object data stored on the server means and/or generating of new object data is herein initiated and controlled by the task data stored in the transponder itself, so that a single reading device can be utilized for all different types of identification carrier.

According to a first preferred embodiment, the task data comprise a computer program which, when run on the server means, executes said task. The computer program is preferably of the immediately executable type, so that the task can be executed directly on the server without compilation of the program. The computer program can be an HTTP-request that can be processed immediately by the accessed server. It is however equally possible to first have the program compiled on the server means, whereafter it can be run by the server means.

In another preferred embodiment the task data comprise a reference to a computer program stored on the server means, wherein the program executes said task when it is run on the server means. This preferred embodiment has the advantage that only a relatively small quantity of task data is required, i.e. practically only a reference to a location on the storage unit or in the memory of the server computer, to have the necessary operations performed on the server computer. This preferred embodiment of the invention can be particularly advantageous in situations where many object data must be processed or generated or in which complex operations have to be performed.

The generating of object data can for instance comprise of generating date and place data from the process of reading the identification carrier which are stored on the server means together with the identification data. On the basis of these place and date data the transport process of a determined object in the course of time can for instance be monitored periodically. Instead of generating new object data, object data already stored on the server means can be processed, for instance by sending these object data, optionally after a change, to the reading device. When the identification carrier is read, the reading device is hereby not only provided with the identification data, but also with (a part of) the object data. It is possible here to envisage for instance a photo of the object associated with the read identification carrier. Another form of processing object data consists of storing on the storage unit of the server means the object data sent by the read unit to the server means.

According to a further preferred embodiment, the method comprises of sending data, in particular the generated object data, from the server means to the read unit and displaying thereof on a screen of the read unit.

According to a further preferred embodiment, the location data comprise a domain name, particularly a Unique Resource Location (URL) in the case internet is used as communication network, so that the location to which the read data must be sent is determined in uniform manner.

According to a further preferred embodiment, the identification data comprise at least one variable pre-stored on the identification carrier. The use of a variable in the programmable part of the chip can result in an identification which, to the human eye, is shorter and possibly more recognizable. The variable can for instance be a freely inputted series of characters or a permanent serial number programmed into the transponder.

According to a determined preferred embodiment, the identification code is a permanent unique code linked to the identification carrier, in particular a Unique Identification (UID) code or serial number stored permanently in the information carrier. The UID code is a relatively long series of characters which is programmed permanently in the memory of the chip, for instance in accordance with ISO standards for the relevant chip type, by the manufacturer of the transponder or at least of the chip on the transponder. Although the freely programmable part of the memory of the chip can be locked, it can nevertheless be copied in relatively simple manner. The unicity of each individual chip, and therefore of each individual transponder, can be better defined and guaranteed by the UID which is hard-coded in the factory.

According to a further preferred embodiment, the method comprises of adding read unit-specific data to the identification data after the step of reading the identification data. The read unit adds this information and sends it to the server means so that the server means can process the received data in a manner adapted to the relevant read unit, and possibly send them back to the read unit.

According to a further preferred embodiment, the method comprises of sending the read unit-specific data to the server means and, subject to the read unit-specific data, generating and sending back said data, in particular object data. By making the returned data dependent on the provided read unit-specific data the server units can send back to the read unit a reply adapted to the relevant read unit.

According to a further preferred embodiment, the read unit-specific data comprise graphic information (such as screen resolution) which is representative of the graphic display of the data to be displayed on the screen of the read unit. These data can be the generated and/or processed object data and/or object data stored earlier on the server means, for instance data about whether or not the relevant object has been stolen, data relating to the dimensions of the object and the like.

According to a further preferred embodiment, the read unit-specific data comprise language information which is representative of the language of the data to be displayed on the screen of the read unit.

According to a further preferred embodiment, the identification data comprise user-specific data and the server means perform an authentication on the basis of the user-specific data for the purpose of optionally allowing specific tasks. User-specific data (such as commercial domain, user name, password) can then also be sent from the read unit to the server means, whereby specific transactions are allowed, such as the entry of a date of sale.

According to a further preferred embodiment, the server means comprise one or more server units coupled via a network such as the internet. Contact can be sought with a random server subject to the read location data. In a particular embodiment contact is first sought with a so-called master server unit. Contact can be made with one or more slave server units, either in indirect manner via the master server unit or in direct manner after permission from the master unit. The step of determining task data from the identification data is therefore preferably performed by a master server unit, and the step of executing a task is performed by one or more slave server units.

According to a further preferred embodiment, the method comprises of determining the geographical position of the object when the identification data are read, and adding geographical data to the identification data.

According to a further preferred embodiment, the identification carrier is a Radio Frequency Identification (RFID) transponder, and the read unit is a radio frequency scanner.

According to a further preferred embodiment, the method comprises of programming the identification carrier with identification data from the server means, preferably from a master server unit associated with the relevant object. Programming can take place with a separate programming unit or with a combined read-write unit. The placing or programming of one or more codes in the identification carrier is performed by the master server unit on the basis of the domain to which this server is assigned. The identification data stored on the master server unit correspond at least partially with identification data stored on the identification carrier itself. After programming, the identification carrier is protected against the placed data being overwritten.

According to a further aspect of the present invention, there is provided a system for obtaining object data representative of an object, wherein the object is provided with at least one identification carrier on which identification data are stored, the system comprising:
  a read unit which is adapted to read identification data from the identification carrier, to determine from the identification data location data of a network location of server means connected to an electronic network, and to send the identification data, on the basis of the location data, to the server means over the electronic network via a communication connection;
  server means which are adapted to determine from the identification data one or more identification codes with which the relevant object can be identified, to compare the identification codes with said object data pre-stored on the server means, to identify the relevant object with the identification codes, to determine task data from the identification data and to execute the associated task on the basis of the task data so as to generate new object data representative of the identified object and/or to modify existing object data.

According to a further aspect of the present invention, there is provided a data carrier, in particular an optical disc or a hard disc, which is provided with a computer program for the purpose, when run on a server computer, of generating and/or processing object data in accordance with the method according to the invention described herein.

Further advantages, features and details of the present invention will be elucidated on the basis of the following description of several preferred embodiments thereof. Reference is made in the description to the accompanying figures, in which:

FIG. 2 shows a flow diagram of the method steps performed by the read unit during the identification of an object;

FIG. 3 shows a flow diagram of the method steps performed by the server during the identification of an object;

FIGS. 4a-4c show flow diagrams of different examples of tasks executed by the server;

FIG. 5 shows a flow diagram of steps performed by the read unit after identification; and FIG. 6 shows a flow diagram of additional steps to be performed by the read unit.

Figure 1:
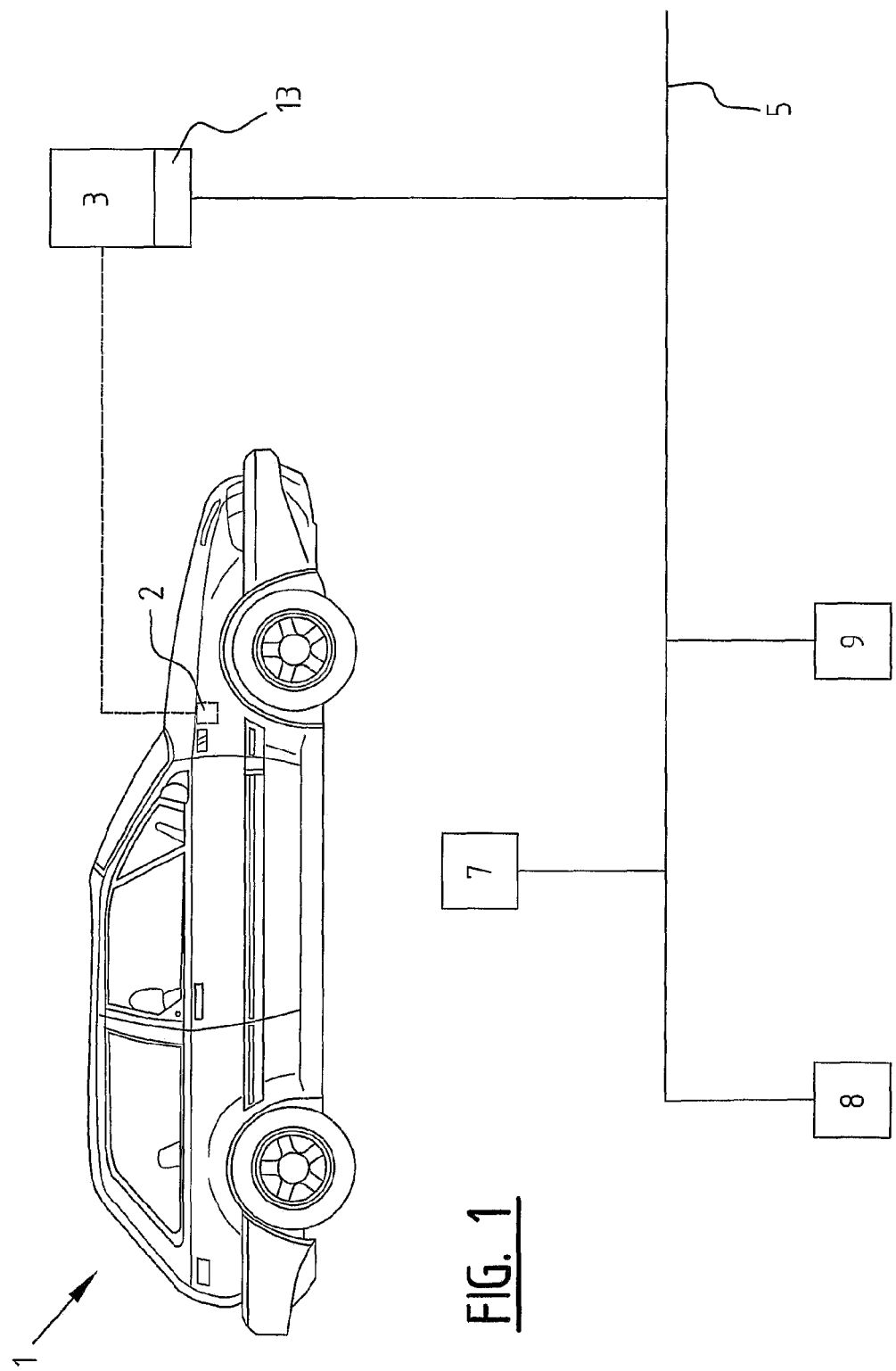
FIG. 1 shows a schematic overview of a system according to a first preferred embodiment of the invention.

FIG. 1 shows an object 1, such as a car, which is provided with an identification carrier 2, for instance in the form of a passive or active Radio Frequency Identification (RFID) transponder. The transponder can be for instance of a type which complies with the ISO 15693 standard with a frequency of 13.56 MHZ and the ISO 11784/85 standard for the 134.2 kHz frequency, so that reading devices of different manufacturers can read the transponder (for instance Philips I-code SLI and Sokymat Q5 respectively). The transponders comprise an LC circuit arranged on a plastic carrier material (dimensions 120 mm×75 mm×2 mm). The plastic carrier material can be fixed, for instance glued, to the object for identifying.

This transponder can be read using electromagnetic reading device 3 via a wireless connection 4. Reading device 3 is connected directly or via a computer to a network 5 such as the internet. One or more servers 7,8,9 are coupled to network 5.

An RFID transponder comprises a memory in which a number of data are permanently stored, such as the Unique Identification (UID) number or serial number of the transponder, while other data can be freely programmed into the memory. During the process of programming the identification carrier, i.e. in this example programming of the transponder that takes place before the process according to the invention of obtaining the object data is performed, a so-called identification code is stored in the programmable, user definable blocks of the memory of the data carrier, i.e. the available memory space designated free by the relevant transponder standard. An example of an identification code can be:

www.lofox.net/x.pl (?) id=123456. The first part of the identification code, i.e. "www.lofox.net", is a domain description with which the location of the server unit can be found on a network 5. The second part, i.e. "x.pl", relates to a task for the server which can be executed by the server. Finally, the identification code includes a variable, i.e. "id=123456". During the programming stage of the identification carrier the identification code stored in the identification carrier is also stored on one of the servers 7-9 together with the optional factory data of the transponder and additional data, such as the type of transponder, for instance factory names and type designations, and placed in the database of the relevant server. A coupling between the identification carriers and the one or more servers thus takes place beforehand.

Together with the identification data, the database can already also comprise object data representative of the object or references to such object data, for instance data relating to the location of the transponder in the object, photo of the object, the manufacturing data of the object. In the example of a car, the serial number of the car, the date of manufacture and the date on which the car left the factory can for instance be stored.

At a later stage, for instance when the car is transported by ship to the customers, the object data associated with the relevant object can be read using a reading device 3. For this purpose reading device 3 makes contact (step 100, FIG. 2) with transponder 2 and reads (step 110) the above-mentioned identification data (reference is made here to the pseudocodes as included in annex A for the scanner application and for the server application).

On the basis of the read location data the reading device or a peripheral device connected thereto can make contact (step 120) with the correct server. Server 7 has for instance the URL www.lofox.net, and an attempt is therefore made in the example to make contact with first server 7. A check is made (step 130) whether contact has been made successfully with the server. If this is not successful, an error message is generated (step 140). The read unit then returns to the step of reading (step 110) the (same or another) transponder. When contact can indeed be made with server 7, reading device 3 sends the read identification data to server 7 (step 150).

Server 7 receives the data (step 200, FIG. 3) and first performs a validation (step 210). The validation takes place for instance on the basis of the above-mentioned variable (which has been programmed into the transponder at the programming stage and is moreover stored on server 7) in combination with the Unique Identification (UID) number or serial number stored permanently in the transponder (and also stored on server 7). It is hereby possible to check whether the scanned transponder is known to the system. If the transponder is unknown, the server generates an error message (step 220) and sends it to reading device 3 (step 230). If the transponder is known to the server 7, server unit 7 extracts the task data (step 240) from the received identification data.

In the present example the read task data relate to an executable, i.e. HTML program with the name "x.pl". The HTML program is run on the server (step 250) and the server executes the tasks contained therein. A task can for instance be to read object data stored earlier on the server (step 260, FIG. 4a), to send to read device 3 a reply (step 270), for instance with the determined object data, to generate new object data (step 280, FIG. 4b), for instance time and date of the present scan, data relating to reading device 3, for instance name, type, time of reading, place of reading, to store generated object data on the relevant server unit (step 290). There are however numerous other tasks which can be executed by the server. It is thus possible for instance to check whether the identified object is for instance known to be stolen (step 300, FIG. 4c). When the database includes an indication for instance that the object is stolen, the program can generate a warning message (step 310) and send this to a determined location, for instance reading device 3 or to server 8 of the original owner of the object, to the police or the like (320).

The object data and possible other data, such as a warning message, sent by server 7 reach reading device 3 at a given moment (step 160, FIG. 5). These data can be displayed on a screen 10 of reading device 3 (step 170). It is also possible to provide reading device 3 with a loudspeaker 11 with which a warning signal can be generated (step 180), for instance when the object is found to be stolen.

According to the flow diagram shown in FIG. 6, after reading of the identification data by the reading device, data which are specific to the relevant reading device 3 are added to these identification data. Because it is unknown in the public domain which reading device will do a readout and in which language it is necessary to communicate, data relating to language settings (step 111) of reading device 3 and/or the resolution of screen 10 (step 112) of reading device 3 will be sent together with the read identification data to the server. When sending back object data, server 7 can then take account of the desired language in which the returned message is displayed on the screen and of the resolution of the relevant screen of the reading device.

According to a determined embodiment, a position-determining system 13, for instance a GPS system, is coupled to reading device 3. During reading of a transponder 2 the momentary position of reading device 3 is simultaneously determined. In such a case position data are also added to the identification data (step 113) and also sent to the relevant server. The server then stores the geographical position data as object data so that later, in addition to the above stated object data such as date and time of reading, the exact position of the object during the reading can also be retrieved.

The present invention is not limited to the preferred embodiments described here. The rights sought are rather defined by the following claims, within the scope of which many modifications can be envisaged.

The invention claimed is:

1. A method for obtaining object data representative of an object for the purpose of identifying the object, wherein the object is provided with at least one identification carrier on which identification data are pre-stored, and wherein object data of a number of objects are pre-stored on server means, the method comprising of:
   reading identification data from the identification carrier of an object with a read unit;
   determining from the identification data location data of one or more network locations of server means connected to an electronic network;
   sending the identification data to the server means via the network on the basis of the location data;
   the server means determining from the identification data one or more identification codes with which the relevant object can be identified;
   comparing the identification codes with said object data pre-stored on the server means;
   identifying the relevant object with the identification codes;
   the server means determining task data from the identification data; and
   having the server means execute the associated task on the basis of the task data so as to generate new object data representative of the identified object and/or to modify existing object data.

2. The method as claimed in claim 1, wherein the task data comprise a computer program which, when run on the server means, executes said task.

3. The method as claimed in claim 2, wherein the computer program is of an immediately executable type.

4. The method as claimed in claim 3, wherein the computer program comprises an HTTP-request.

5. The method as claimed in claim 1, wherein the task data comprise a reference to a computer program stored on the server means, wherein the program executes said task when it is run on the server means.

6. The method as claimed in claim 1, wherein the processing of the object data comprises of sending the object data to the read unit.

7. The method as claimed in claim 6, also comprising of storing the generated object data.

8. The method as claimed in claim 6, comprising of sending data, in particular the generated object data, from the server means to the read unit and displaying thereof on a screen of the read unit.

9. The method as claimed in claim 8, comprising of adding read unit-specific data to the identification data after the step of reading the identification data.

10. The method as claimed in claim 9, comprising of sending the read unit-specific data to the server means and, subject to the read unit-specific data, generating and sending back said data, in particular object data.

11. The method as claimed in claim 9, wherein the read unit-specific data comprise graphic information which is representative of the graphic display of the data to be displayed on the screen of the read unit.

12. The method as claimed in claim 9, wherein the read unit-specific data comprise language information which is representative of the language of the data to be displayed on the screen of the read unit.

13. The method as claimed in claim 1, wherein the location data comprise a domain name.

14. The method as claimed in claim 13, wherein the location data comprise a Unique Resource Location (URL) and the network is the internet.

15. The method as claimed in claim 1, wherein the identification data comprise at least one variable pre-stored on the identification carrier.

16. The method as claimed in claim 1, wherein the identification code is a permanent unique code linked to the identification carrier, in particular a Unique Identification (UID) code or serial number stored permanently in the information carrier.

17. The method as claimed in claim 1, wherein the server means comprise one or more server units coupled via a network such as the internet.

18. The method as claimed in claim 17, wherein the step of determining task data from the identification data is performed by a master server unit, and the step of executing a task is performed by one or more slave server units.

19. The method as claimed in claim 1, comprising of determining the geographical position of the object when the identification data are read, and adding geographical data to the identification data.

20. The method as claimed in claim 1, wherein the identification carrier is a Radio Frequency Identification (RFID) transponder, and the read unit is a radio frequency scanner.

21. The method as claimed in claim 1, wherein the identification data comprise user-specific data and wherein the server means perform an authentication on the basis of the user-specific data for the purpose of optionally allowing specific tasks.

22. The method as claimed in claim 1, comprising of programming the identification carrier with identification data from the server means, preferably from a master server unit associated with the relevant object.

23. The method as claimed in claim 22, comprising of protecting the identification carrier against being overwritten after programming.

24. A system for obtaining object data representative of an object for the purpose of identifying the object, wherein the object is provided with at least one identification carrier on which identification data are stored, and wherein object data of a number of objects are pre-stored on server means, the system comprising:
    a read unit which is adapted to read identification data from the identification carrier, to determine from the identification data location data of a network location of server means connected to an electronic network, and to send the identification data, on the basis of the location data, to the server means over the electronic network via a communication connection; and
    server means which are adapted to determine from the identification data one or more identification codes with which the relevant object can be identified, to compare the identification codes with said object data pre-stored on the server means, to identify the relevant object with the identification codes, to determine task data from the identification data and to execute the associated task on the basis of the task data so as to generate new object data representative of the identified object and/or to modify existing object data.

25. The system as claimed in claim 24, wherein the task data comprise a computer program and wherein the server means are adapted to run the computer program in order to execute the task.

26. The system as claimed in claim 25, wherein the computer program is of an immediately executable type.

27. The system as claimed in claim 26, wherein the computer program comprises an HTTP-request.

28. The system as claimed in claim 24, wherein the task data comprise a reference to a computer program stored on the server means, wherein the program executes said task when it is run on the server means.

29. The system as claimed in claim 24, wherein the server means are adapted to process the object data by sending the object data to the read unit.

30. The system as claimed in claim 29, wherein the server means are adapted to store the generated object data thereon.

31. The system as claimed in claim 29, wherein the server means are adapted to send data, in particular the generated object data, to the read unit, and the read unit is adapted for display thereof on a screen of the read unit.

32. The system as claimed in claim 31, comprising of sending the read unit-specific data to the server means and, subject to the read unit-specific data, generating and sending back said data, in particular object data.

33. The system as claimed in claim 24, wherein the location data comprise a domain name.

34. The system as claimed in claim 33, wherein the location data comprise a Unique Resource Location (URL) and the network is the internet.

35. The system as claimed in claim 24, wherein the identification code is a permanent unique code linked to the identification carrier, in particular a Unique Identification (UID) code or serial number stored permanently in the information carrier.

36. The system as claimed in claim 24, comprising of adding read unit-specific data to the identification data after the step of reading the identification data.

37. The system as claimed in claim 36, wherein the read unit-specific data comprise graphic information which is representative of the graphic display of the data to be displayed on the screen of the read unit.

38. The system as claimed in claim 36, wherein the read unit-specific data comprise language information which is representative of the language of the data to be displayed on the screen of the read unit.

39. The system as claimed in claim 24, wherein the server means comprise one or more server units coupled via a network such as the internet.

40. The system as claimed in claim 39, comprising a master server unit which is adapted to determine task data from the identification data, and one or more slave server units adapted to execute the task.

41. The system as claimed in claim 24, wherein the read unit is adapted to determine the geographical position of the object when the identification data are read, and to add geographical data to the identification data.

42. The system as claimed in a claim 24, wherein the identification carrier is a Radio "Frequency Identification (RFID) transponder, and the read unit is a radio frequency scanner.

43. The system as claimed in claim 24, wherein the identification data comprise user-specific data and wherein the server means perform an authentication on the basis of the user-specific data for the purpose of optionally allowing specific tasks.

44. The system as claimed in claim 24, comprising means for programming the identification carrier with identification data from the server means, preferably from a master server unit associated with the relevant object.

45. The system as claimed in claim 24, wherein the identification data comprise at least one variable pre-stored on the identification carrier.

46. A non-transitory computer readable recording medium with a computer programmed recorded thereon executed by a processor to perform the method of obtaining object data representative of an object for the purpose of identifying the object, wherein the object is provided with at least one identification carrier on which identification data are pre-stored, and wherein object data of a number of objects are pre-stored on server means, the method comprising:
reading identification data from the identification carrier of an object with a read unit;
determining from the identification data location data of one or more network locations of server means connected to an electronic network;
sending the identification data to the server means via the network on the basis of the location data;
the server means determining from the identification data one or more identification codes with which the relevant object can be identified;
comparing the identification codes with said object data pre-stored on the server means;
identifying the relevant object with the identification codes;
the server means determining task data from the identification data; and
having the server means execute the associated task on the basis of the task data so as to generate new object data representative of the identified object and/or to modify existing object data.

\* \* \* \* \*